United States Patent
Aizawa

(10) Patent No.: US 10,318,214 B1
(45) Date of Patent: Jun. 11, 2019

(54) IMAGE PROCESSING APPARATUS

(71) Applicant: KONICA MINOLTA, INC., Chiyoda-ku, Tokyo (JP)

(72) Inventor: Hiroaki Aizawa, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 10 days.

(21) Appl. No.: 15/883,622

(22) Filed: Jan. 30, 2018

(30) Foreign Application Priority Data

Feb. 28, 2017 (JP) .................................. 2017-037625

(51) Int. Cl.
*H04N 1/04* (2006.01)
*G06F 3/12* (2006.01)
*H04N 1/00* (2006.01)
*G06K 15/02* (2006.01)
*H04N 1/32* (2006.01)

(52) U.S. Cl.
CPC .......... *G06F 3/1213* (2013.01); *G06F 3/1267* (2013.01); *G06F 3/1274* (2013.01); *G06K 15/1836* (2013.01); *H04N 1/00344* (2013.01); *H04N 1/00811* (2013.01); *H04N 1/32459* (2013.01); *H04N 2201/0094* (2013.01)

(58) Field of Classification Search
CPC .......... H04N 1/00811; H04N 1/00344; H04N 1/32459; H04M 2201/0094
USPC .......................................................... 358/1.15
See application file for complete search history.

(56) References Cited

U.S. PATENT DOCUMENTS 9,716,800 B2 * 7/2017 Shibao ............... H04N 1/00217
2006/0132858 A1 * 6/2006 Hosoda ................... G06T 11/60
358/452

FOREIGN PATENT DOCUMENTS

JP    2010-134336 A    6/2010

* cited by examiner

*Primary Examiner* — Houshang Safaipour
(74) *Attorney, Agent, or Firm* — Buchanan Ingersoll & Rooney PC

(57) ABSTRACT

Disclosed is an image processing apparatus, including a receiver that receives a setting of a job; a reader that optically reads an original; a memory that stores the image data; and a hardware processor that instructs the external device to store the image data to be edited, and edits the image data page by page by using the page edit function of the external device, wherein when a temporary storing job for temporarily storing the image data in the memory is executed, the hardware processor judges whether a setting of a setting item for an edit of the image data page by page is changed, and in case that the setting of the setting item is changed, the hardware processor carries out a preceding transmission process in which the image data stored in the memory is transmitted to the external device and is stored in the external device.

5 Claims, 6 Drawing Sheets

IMAGE PROCESSING APPARATUS

The entire disclosure of Japanese Patent Application No. 2017-37625 filed on Feb. 28, 2017, is incorporated herein by reference in its entirety.

BACKGROUND

Technological Field

The present invention relates to an image processing apparatus which can edit the image data obtained by reading an original in the reading unit, page by page.

Description of the Related Art

In the image processing apparatus, such as a multi function peripheral or the like, the image data obtained by reading an original using the scanner is temporarily stored in the interior storing device, and the stored image data is edited page by page by carrying out the preview display for the image data (See Japanese Patent Application Publication No. 2010-134336). In the edit of the image data page by page, for example, the image quality adjustment, the output setting (the setting of the staple, the punch and the like) and the like are included.

In an editing device which has the editing function for editing the data job by job, but does not have the editing function for editing the data page by page, it is considered that the image data handled by the editing device is edited page by page by using an external device which is connected with the editing device and which has the editing function for editing the data page by page. For example, in case that the print controller having the function for rasterizing the print data is connected as the external device, when the above print controller has the editing function for editing the data page by page, it is possible to realize the editing function for editing the image data obtained by using the scanner, page by page by using the above print controller.

In case that the image data is edited page by page by using the external print controller, it is necessary to forward (transmit) the image data of the page to be edited from the image processing apparatus to the external print controller. In the forwarding of the image data, the following problem is caused.

After the temporary storing job for temporarily storing the image data obtained by reading the original using the scanner is executed, the image data to be edited is transmitted to the external print controller when the editing instruction for editing the image data page by page is received from the user (Method 1 shown in FIG. 6). In this method, until the transmission of the image data is finished, the editing function for editing the data page by page cannot be used. Therefore, the user waits for the start of the editing operation until the transmission of the image data is finished.

On the other hand, when the temporary storing job is executed, the image data which is temporarily stored is always transmitted to the external print controller (Method 2 shown in FIG. 6). In this method, when the editing function for editing the image data page by page is used, the editing operation can be immediately carried out. Therefore, as compared with Method 1, it is possible to shorten the time to be spent until the edit of the image data is finished. However, in case the data is always transmitted to the external print controller and is stored in the external print controller when the temporary storing job is executed, the image data which is not edited page by page is also stored in the print controller. Therefore, the resources (HDD and the like) of the print controller are unnecessarily wasted.

SUMMARY

One of the objects of the present invention is to provide an image processing apparatus which can prevent the unnecessary transmission of the image data to the external device and can prevent the delay in the start of the editing operation due to the wait for the transmission of the print data to the external device in case that the image data obtained by reading the original is edited page by page by using the page edit function of the external device.

To achieve at least one of the abovementioned objects, according to an aspect of the present invention, an image processing apparatus reflecting one aspect of the present invention, comprises:

a receiver that receives a setting of a job;

a reader that optically reads an original;

a memory that stores the image data;

a communicator that receives the image data from the external device and transmits the image data to the external device; and a hardware processor that instructs the external device to store the image data to be edited in the image memory by transmitting the image data to be edited to the external device, that edits the image data page by page by using the page edit function of the external device, and that controls an execution of the job received by the receiver, wherein when a temporary storing job for reading the original in the reader and temporarily storing the image data obtained by reading the original in the memory is executed in accordance with a control of the hardware processor, the hardware processor judges whether a setting of a setting item for an edit of the image data page by page is changed in a setting of the temporary storing job, and in case that the setting of the setting item for the edit of the image data page by page is changed, the hardware processor carries out a preceding transmission process in which the image data stored in the memory by executing the temporary storing job is transmitted to the external device and is stored in the image memory.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENT

Hereinafter, one or more embodiments of the present invention will be described with reference to the drawings. However, the scope of the invention is not limited to the disclosed embodiments.

Figure 1:
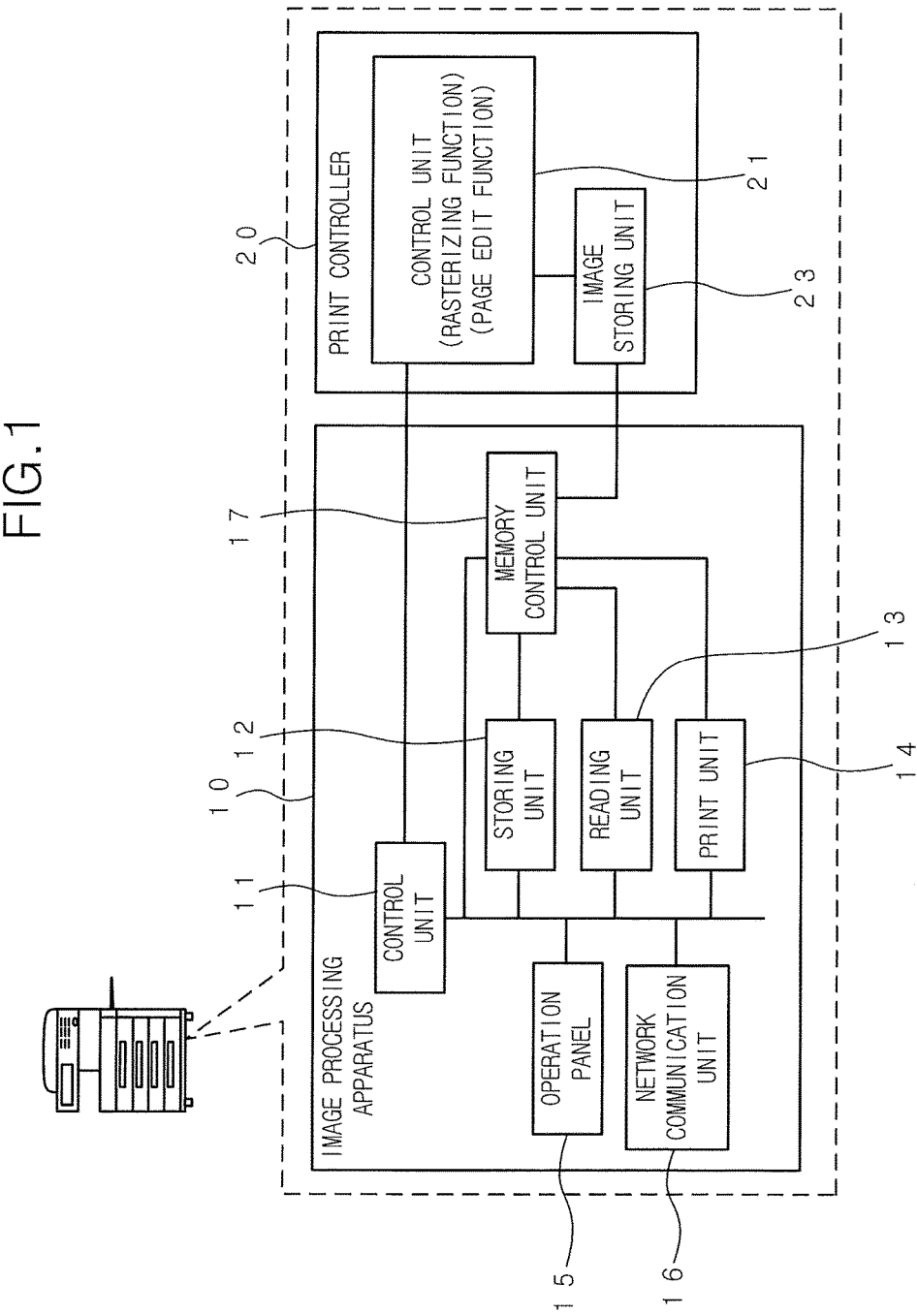
FIG. 1 is a block diagram showing the schematic configuration of the print system according to the embodiment.

FIG. 1 shows an example of the image processing apparatus 10 according to the embodiment. The image processing apparatus 10 is a so-called multi function peripheral which has the copy function for printing out an image of an original on a recording sheet by optically reading the original, the scan function for temporarily storing the image data of the read original or the like and/or for transmitting the image data to an external device via a network, the print function for printing out an image in accordance with the image data received from the user's information processing terminal, and the like.

The image processing apparatus 10 is connected with the print controller 20 as the external device for generating the image data by rasterizing each page of the print data.

The image processing apparatus 10 comprises a control unit 11 for entirely controlling the operation of the image processing apparatus 10. The control unit 11 comprises a CPU (Central Processing Unit) as the hardware processor. The control unit 11 is connected with a storing unit 12, a reading unit 13, a print unit 14, an operation panel 15, a network communication unit 16, a memory control unit 17 and the like. The print controller 20 comprises a control unit 21, an image storing unit 23 and the like.

The storing unit 12 (memory) of the image processing apparatus 10 comprises a ROM (Read Only Memory), a RAM (Random Access Memory), a nonvolatile memory, a hard disk drive and the like. In the storing unit 12, various types of programs are stored. By executing various types of processes by the control unit 11 in accordance with these programs, each function of the image processing apparatus 10 is realized. The storing unit 12 is used as a work memory, a communication buffer, a temporary storing unit for temporarily storing a file, an image data, and the like.

The reading unit 13 (reader) has the function for obtaining the image data by optically reading the original. For example, the reading unit 13 comprises a light source for irradiating an original set on the platen glass with light, a line image sensor for reading the original line by line in the width direction of the original by receiving the reflected light from the original, a moving unit for sequentially moving the position at which the light source irradiates the original with the light and the reading position of the line image sensor line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The print unit 14 has the function for forming an image on the recording sheet in accordance with the image data. In this embodiment, the print unit 14 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The operation panel 15 is a user interface device comprising a display unit and an operating unit. The display unit comprises a liquid crystal display (LCD) and the like, and has the function for displaying various types of operation windows, setting windows and the like. The operating unit comprises various types of hardware keys, such as a numeric keypad, a start button and the like, and a touch panel provided on the physical screen of the display unit. The touch panel detects the coordinate position on which a user touches the touch panel to operate the image processing apparatus 10 by using a touch pen, a user's finger or the like. The operation panel 15 has the function as the job setting unit (receiver) for receiving the job setting.

The network communication unit 16 has the function for communicating with a user's or an administrator's information processing terminal and the other external devices via the network, such as LAN (Local Area Network) or the like.

The memory control unit 17 controls the writing of the image data in the storing unit 12 and the reading of the image data from the storing unit 12 in accordance with the instruction from the control unit 11. Further, the memory control unit 17 has the function as the communication unit (communicator) for transmitting and receiving (forwarding) the image data between the image processing apparatus 10 and the print controller 20. For example, the memory control unit 17 sequentially stores the image data in the storing unit 12 when the image data is sequentially output from the reading unit 13 during the reading of the original. Further, in case that the image data stored in the storing unit 12 is printed by the print unit 14, the image data stored in the storing unit 12 is sequentially read so as to match with the timing of the print operation of the print unit 14 to output the image data to the print unit 14. Further, the memory control unit 17 has the function as the communication unit (communicator) for transmitting the image data which is temporarily stored in the storing unit 12 to the image storing unit 23 of the print controller 20 to instruct the print controller 20 to store the image data, and for reading the image data stored in the image storing unit 23 to forward the image data to the storing unit 12 of the image processing apparatus 10.

The control unit 21 of the print controller 20 comprises a CPU, a RAM, a ROM, a nonvolatile memory and the like as a main unit. By operating the print controller 20 using the control unit 21 in accordance with the programs stored in the ROM and the like, each function of the print controller 20 is realized. The image storing unit 23 is a nonvolatile memory, such as a hard disk drive or the like, and is used for storing the print data, the image data obtained by rasterizing the print data, the image data transmitted from the image processing apparatus 10, and the like. The print controller 20 has the rasterizing function for expanding the print data into the image data, and the page edit function for editing the image data page by page.

The control unit 11 of the image processing apparatus 10 has the function as the job execution control unit for controlling the execution of the job received by the operation panel 15 or the like, and as the edit control unit for instructing the print controller 20 to store the image data to be edited in the image storing unit 23 by transmitting the image data to be edited to the image storing unit 23 of the print controller 20, and for editing the image data to be edited page by page by using the page edit function of the print controller 20.

Figure 2:
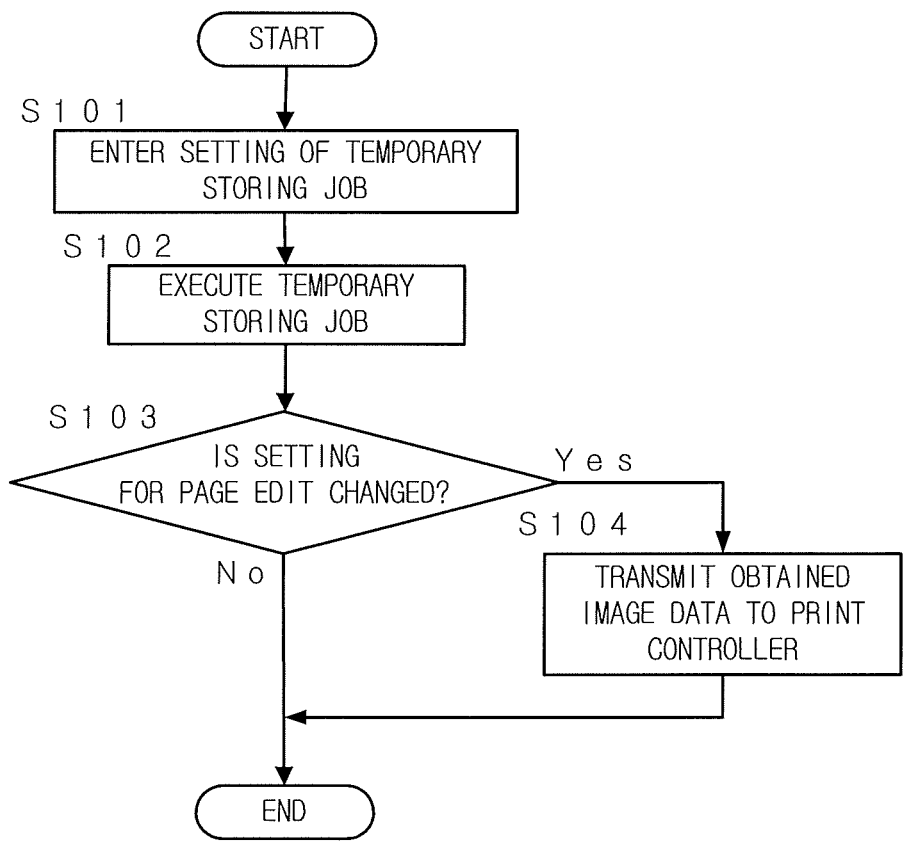
FIG. 2 is a flowchart showing the image data forward control process which is carried out when the image processing apparatus according to the embodiment executes the temporary storing job.

FIG. 2 is a flowchart which schematically shows the operation which is carried out when the image processing apparatus 10 executes the temporary storing job. The temporary storing job is a job for optically reading the original by the reading unit 13 and (temporarily) storing the image data obtained by reading the original in the storing unit 12. Then, the image data stored by executing the temporary storing job is edited and is printed by the print unit 14 or is output to an external device as the data to be output.

When the image processing apparatus 10 receives various types of settings relating to the temporary storing job from the user via the operation panel 15 and receives the operation for entering the temporary storing job (Step S101), the image processing apparatus 10 executes the temporary storing job in accordance with the settings. That is, the image processing apparatus 10 optically reads the original by using the reading unit 13 in accordance with the settings of the job, and (temporarily) stores the image data obtained by reading the original in the storing unit 12 (Step S102).

Then, in the settings of the temporary storing job, the image processing apparatus 10 judges whether the setting of the item for the page edit (the edit of the image data page by page) is changed (the setting value is changed from the default value) (Step S103). In the item for the page edit, for example, the image quality adjustment, the output setting (the staple, the punch and the like) and the like are included.

In case that the setting of the item for the page edit is not changed in the setting of the job (Step S103; No), the process is ended. In case that the setting of the item for the page edit is changed in the setting of the job (Step S103; Yes), the image processing apparatus 10 estimates that there is high possibility that the image data is edited page by page. Then, the image processing apparatus 10 carries out the preceding transmission process in which the image data obtained by executing the temporary storing job in Step S102 is transmitted to the print controller 20 and the print controller 20 is instructed to store the image data in the image storing unit 23 (Step S104), and the process is ended. Among the image data stored in the storing unit 12, with respect to the image data which has been transmitted to the print controller 20 in the preceding transmission process, the information indicating that the image data has been transmitted is added.

It is not necessary to carry out the preceding transmission process in which the image data is transmitted to the print controller 20, after the temporary storing job is executed. The preceding transmission process may be carried out in parallel with the execution of the temporary storing job. For example, the image processing apparatus 10 carries out the judgment shown in Step S103 at the starting of the execution of the temporary storing job, and in case that the setting of the item for the page edit is changed, the image processing apparatus 10 carries out the preceding transmission process (the transmission of the image data as shown in Step S104) in parallel with the execution of the temporary storing job. In detail, at the same time at which the memory control unit 17 stores the image data output from the reading unit 13 in the storing unit 12, the memory control unit 17 transmits the image data to the image storing unit 23 of the print controller 20. Alternatively, while the memory control unit 17 stores the image data output from the reading unit 13 in the storing unit 13, the memory control unit 17 transmits the image data to the image storing unit 23 of the print controller 20 by reading the image data of the page which has been stored, from the storing unit 12.

As described above, in case that the setting of the item for the page edit is changed in the setting of the temporary storing job, the image processing apparatus 10 estimates that there is high possibility that the image data obtained by executing the temporary storing job is edited page by page later. Then, incidental to the execution of the temporary storing job, the image processing apparatus 10 carries out the preceding transmission process in which the image data obtained by executing the temporary storing job is transmitted to the print controller 20 to instruct the print controller 20 to store the image data in the image storing unit 23. Therefore, after the execution of the temporary storing job, in case that the user instructs the start of the page edit for the image data obtained by executing the temporary storing job, it is possible to immediately edit the image data page by page by using the page edit function of the print controller 20 because the image data to be edited has been stored in the image storing unit 23 of the print controller 20.

On the other hand, in case that the setting of the item for page edit is not changed in the setting of the temporary storing job, the image processing apparatus 10 estimates that there is low possibility that the image data obtained by executing the temporary storing job is edited page by page later. Then, the image processing apparatus 10 does not transmit the image data obtained by executing the temporary storing job to the print controller 20 (the image processing apparatus 10 does not carry out the preceding transmission process). As a result, it is prevented that the storing area of the image storing unit 23 of the print controller 20 is unnecessarily used.

In the preceding transmission process shown in Step S104, the image data of all of the pages, which are obtained by executing the temporary storing job, are transmitted to the print controller 20 to store the image data in the image storing unit 23. However, in accordance with another condition (the edit unnecessary condition is satisfied or not), it may be judged whether the image data is transmitted page by page.

Figure 3:
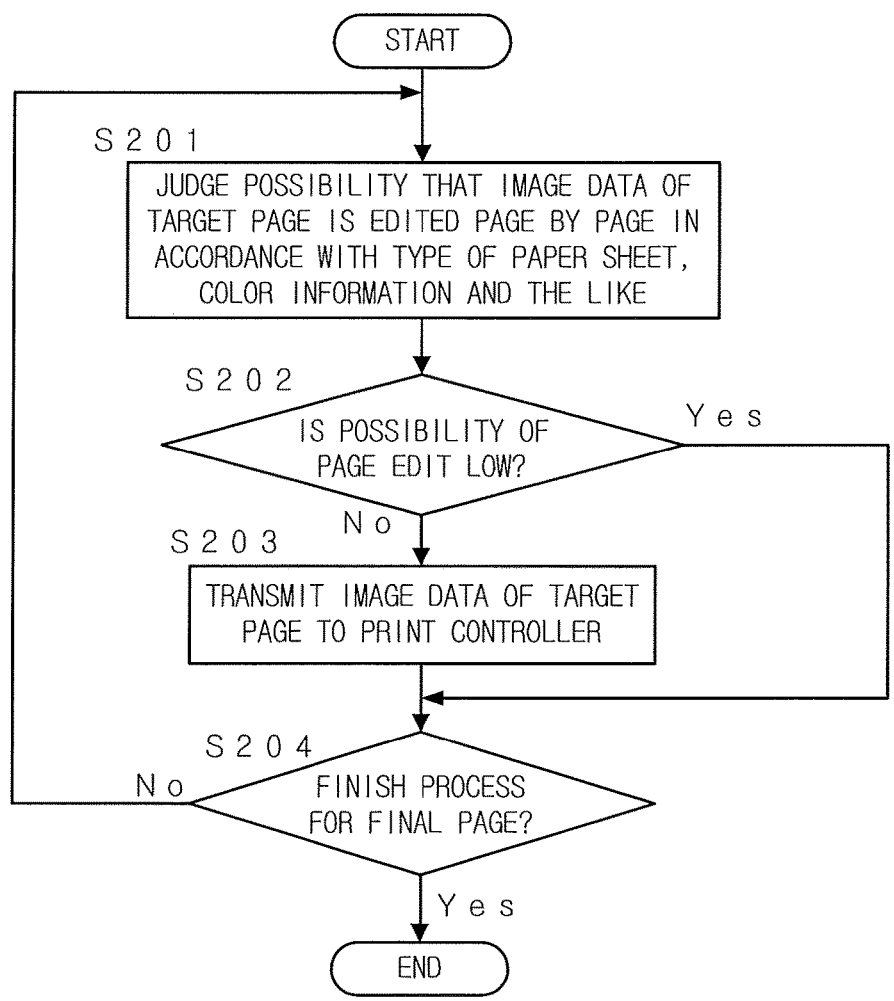
FIG. 3 is a flowchart showing the process for judging whether to forward the image data page by page, which is carried out instead of Step S104 of FIG. 2.

FIG. 3 shows the preceding transmission process in case that it is judged whether the image data is transmitted to the print controller 20 page by page, instead of the process which is carried out in Step S104 shown in FIG. 2.

In the order from the first page, one page of the image data obtained by executing the temporary storing job is referred to as the target page. The control unit 11 of the image processing apparatus 10 judges whether the target page satisfies the predetermined edit unnecessary condition (Step S201). In accordance with the type of paper sheet, the color information of the target page, and the like, it is judged whether the target page satisfies the edit unnecessary condition. For example, in case that the read original is the original including the monochrome page and the color page, it is judged that there is some possibility that the page edit is carried out for the color page (the color page does not satisfy the edit unnecessary condition). On the other hand, it is judged that there is low possibility that the page edit is carried out for the monochrome page (the monochrome page satisfies the edit unnecessary condition).

When the image processing apparatus 10 judges that there is high possibility that the page edit is carried out for the target page (the target page does not satisfy the edit unnecessary condition) (Step S202; No), the image processing apparatus 10 transmits the image data of the target page to the print controller 20 (Step S203). Then, the process proceeds to Step S204. When the image processing apparatus 10 judges that there is low possibility that the page edit is carried out for the target page (the target page satisfies the edit unnecessary condition) (Step S202; Yes), the image processing apparatus 10 does not transmit the image data of the target page to the print controller 20. Then, the process proceeds to Step S204.

In Step S204, it is checked whether the process for the final page is finished. In case that the process for the final page is not finished (Step S204; No), the next page is treated as the target page and the process is continued by returning to Step S201. When the process for the final page is finished (Step S204; Yes), the process is ended.

Figure 4:
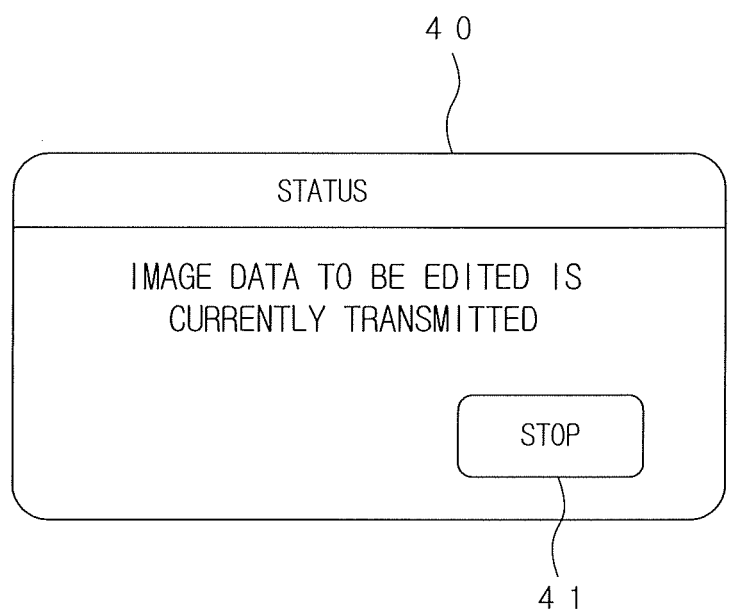
FIG. 4 is a view showing an example of the window which is displayed on the operation panel of the image processing apparatus while the image processing apparatus transmits the image data to the print controller.

When the image data is transmitted from the image processing apparatus 10 to the print controller 20, the transmission window 40 shown in FIG. 4 is displayed on the operation panel 15 of the image processing apparatus 10. In the transmission window 40, the transmission stop button 41 is displayed as the stop instruction receiving unit for receiving the stop instruction of the transmission of the image data (the preceding transmission process). When a user presses down the transmission stop button 41 (stop instruction receiving unit) displayed in the transmission window 40, the image processing apparatus 10 stops the transmission of the image data to the print controller 20 (the preceding transmission process).

Figure 5:
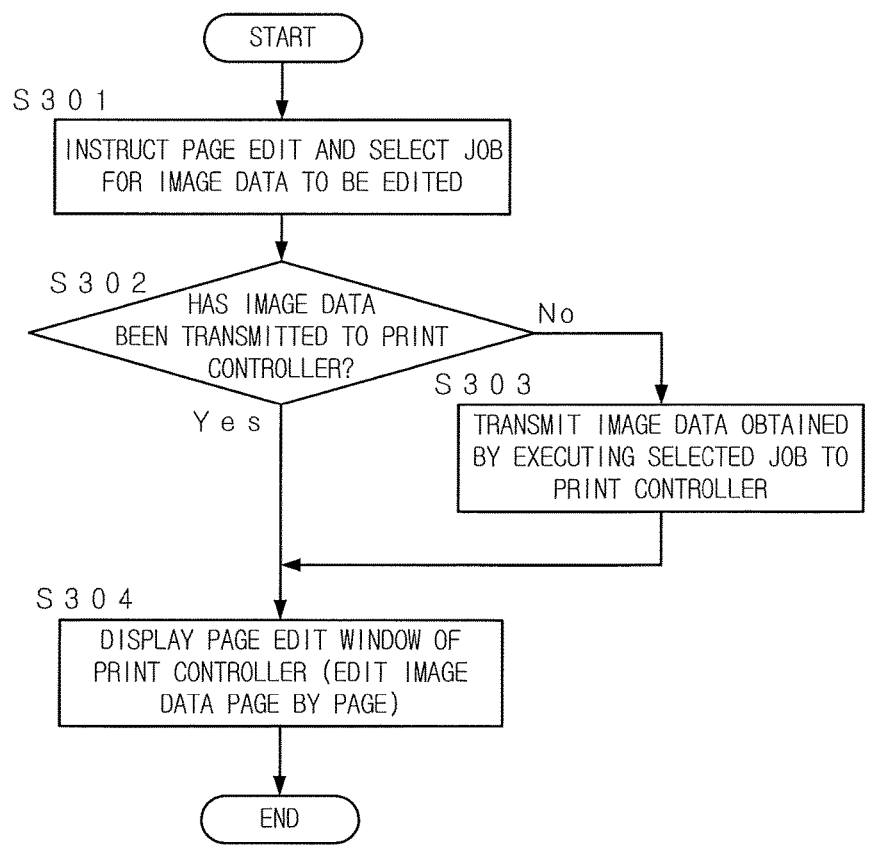
FIG. 5 is a flowchart showing the process which is carried out when the image processing apparatus according to the embodiment carries out the page edit operation by using the function of the print controller.
Figure 6:
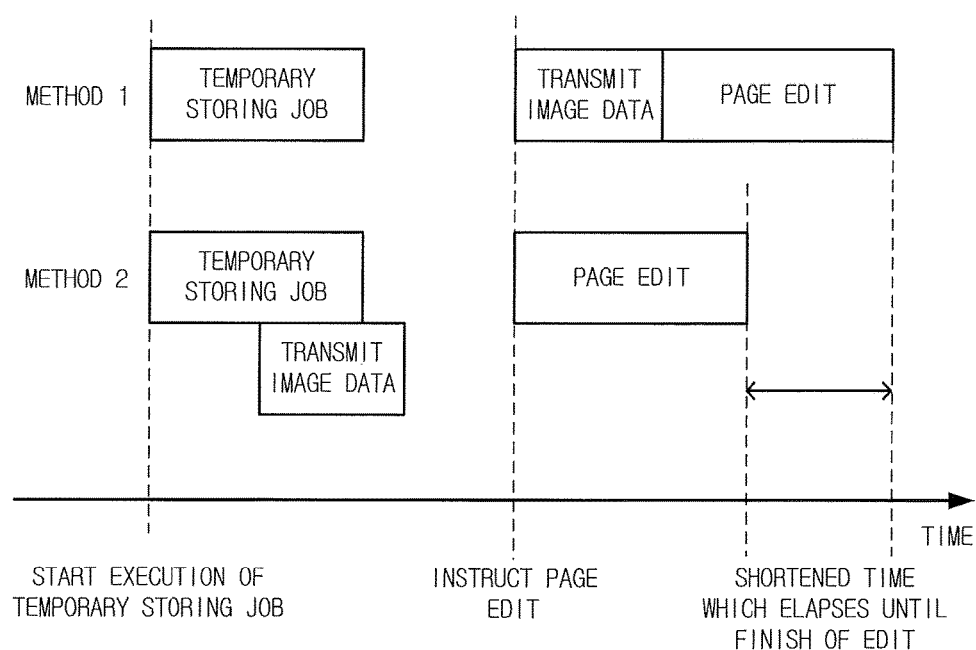
FIG. 6 is a view showing Method 1 and Method 2 so as to compare them.

FIG. 5 is a flowchart showing the process which is carried out by the image processing apparatus 10 when the image processing apparatus 10 receives the page edit instruction from a user. The image processing apparatus 10 receives the instruction for starting the page edit and the selection of the temporary storing job for the image data to be edited (Step S301). The image data stored in the storing unit 12 by executing the selected temporary storing job becomes the image data to be edited.

The image processing apparatus 10 judges whether the image data stored in the storing unit 12 by executing the selected temporary storing job has been already transmitted to the print controller 20 (Step S302). In case that the image data has been transmitted (Step S302; Yes), the image processing apparatus 10 starts the page edit for the image data which has been already stored in the image storing unit 23 of the print controller 20, by using the page edit function of the print controller 20 (Step S304).

In case that the image data stored in the storing unit 12 by executing the temporary storing job selected in Step S301 has not been transmitted to the print controller 20 (Step S302; No), the image processing apparatus 10 reads the image data obtained by executing the temporary storing job selected in Step S301, from the storing unit 12, and transmits the image data to the print controller 20 to instruct the print controller 20 to store the image data in the image storing unit 23 (Step S303). After the above process is finished, the image processing apparatus 10 starts the page edit by using the page edit function of the print controller 20 (Step S304).

The print controller 20 edits the image data stored in the image storing unit 23, page by page (for example, the image quality adjustment). The image processing apparatus 10 carries out the preview of the image indicating the result of the page edit.

In case that the image data of the page for which the page edit is carried out by the print controller 20 is output to an external device or the print unit 14, the image data may be output by reading the image data from the image storing unit 23 of the print controller 20. Alternatively, the image data may be temporarily forwarded to the storing unit 12 from the image storing unit 23, and the image data may be output from the storing unit 12.

In case that the page edit is not carried out for the image data stored in the image storing unit 23 by transmitting the image data to the print controller 20 in the preceding transmission process even though the predetermined time elapses since the transmission of the image data, the image processing apparatus 10 deletes the image data from the image storing unit 23 of the print controller 20. Because the original image data is stored in the storing unit 12 of the image processing apparatus 10 even though the image data is deleted from the image storing unit 23, the image data can be read out from the storing unit 12 to transmit the image data to the print controller 20 in case that the instruction for carrying out the page edit for the image data is received after the image data is deleted from the image storing unit 23.

When the page edit is finished and the output of the edited image data is finished, one of the following processes is carried out according to the setting relating to the deletion of the image data. (1) Both of the edited image data stored in the image storing unit 23 and the original image data which is temporarily stored in the storing unit 12 are deleted. (2) One of the edited image data and the original image data is deleted. (3) Neither the edited image data nor the original image data is deleted.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the external device which is connected with the image processing apparatus 10 and has the page edit function, is the print controller 20. The above external device is not limited to the print controller 20, may be another external device. Further, the above external device may be an external device dedicated to the page edit.

The communication of the image data between the image processing apparatus 10 and the external device (print controller 20) is not limited to the method in which the image data is received and transmitted via the memory control unit 17 as shown in the embodiment. An optional communication method may be adopted.

In the setting of the temporary storing job, the setting item for the edit of the image data page by page is not limited to the items shown in the embodiment. Further, the condition for judging the possibility that the image data is edited page by page in Step S201 shown in FIG. 3 (the edit unnecessary condition), is not limited to the color information. For example, in case that the density of the image data is changed in the setting of the temporary storing job, it may be judged that there is high possibility that the image data of the page in which the density value of the image (for example, the average density value) is not within the proper range (the image is darker than the proper range or is brighter than the proper range, or the like) is edited page by page (the edit unnecessary condition is not satisfied). On the other hand, it may be judged that there is low possibility that the image data of the page in which the density value of the image is within the proper range is edited page by page (the edit unnecessary condition is satisfied). That is, the possibility of the page edit for each page (whether the edit unnecessary condition is satisfied or not) may be judged in accordance with the relation between the setting item for the edit of the image data page by page, in which the setting value is changed in the setting of the job, and the situation of the image of each page, which relates to the setting item having the changed setting value.

In this embodiment, in case that the setting of the setting item for the edit of the image data page by page is changed in the setting of the temporary storing job, the preceding transmission process in which the image data stored in the memory by executing the temporary storing job is transmitted to the external device and is stored in the image memory is carried out when the temporary storing job is executed.

In this embodiment, the necessity of the preceding transmission process (whether the edit unnecessary condition is satisfied) is judged page by page. Therefore, the unnecessary transmission of the image data of the page which is not edited is prevented.

In this embodiment, the image data which has not been stored in the image memory of the external device by the preceding transmission process when the page edit is carried out, is transmitted to the external device at this time.

In this embodiment, because there is some possibility that the page edit is not carried out for the image data stored in the external device by the preceding transmission process, the stored image data is automatically deleted after the predetermined time elapses.

In this embodiment, a user can stop the preceding transmission process while the preceding transmission process is carried out.

According to the image processing apparatus, it is possible to prevent the unnecessary transmission of the image data to the external device and to prevent the delay in the start of the editing operation due to the wait for the transmission of the print data to the external device in case that the image data obtained by reading the original is edited page by page by using the page edit function of the external device.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image processing apparatus to be connected with an external device having a page edit function for editing an image data page by page, which is stored in an image memory of the external device, the image processing apparatus comprising:
 a receiver that receives a setting of a job;
 a reader that optically reads an original;
 a memory that stores the image data;
 a communicator that receives the image data from the external device and transmits the image data to the external device; and
 a hardware processor that instructs the external device to store the image data to be edited in the image memory by transmitting the image data to be edited to the external device, that edits the image data page by page by using the page edit function of the external device, and that controls an execution of the job received by the receiver,
 wherein when a temporary storing job for reading the original in the reader and temporarily storing the image data obtained by reading the original in the memory is executed in accordance with a control of the hardware processor, the hardware processor judges whether a setting of a setting item for an edit of the image data page by page is changed in a setting of the temporary storing job, and
 wherein each time the setting of the setting item for the edit of the image data page by page is changed, the hardware processor carries out a preceding transmission process in which the image data stored in the memory by executing the temporary storing job is transmitted to the external device and is stored in the image memory, except that even though the setting of the setting item for the edit of the image data page by page is changed the hardware processor does not carry out the preceding transmission process for the image data of a page which satisfies a predetermined edit unnecessary condition, wherein the image data of a page which satisfies the predetermined edit unnecessary condition is not edited by the image processing apparatus.

2. The image processing apparatus of claim 1, wherein in case that the image data to be edited is not stored in the image memory when the hardware processor edits the image data stored in the memory page by page, the hardware processor transmits the image data of a page to be edited, which is stored in the memory, to the external device and instructs the external device to store the image data of the page in the image memory.

3. The image processing apparatus of claim 1, wherein the hardware processing apparatus deletes the image data stored in the image memory by the preceding transmission process, from the image memory after a predetermined time elapses.

4. The image processing apparatus of claim 1, wherein the receiver receives a stop instruction for stopping the preceding transmission process, and
 when the receiver receives the stop instruction, the hardware processor stops the preceding transmission process which is currently carried out.

5. The image processing apparatus of claim 1, wherein the external device is a print controller having a function for generating the image data by rasterizing a print data.

* * * * *